United States Patent
Bertoni et al.

(10) Patent No.: US 8,963,715 B2
(45) Date of Patent: Feb. 24, 2015

(54) APPARATUS HAVING A HOUSING, WITH INTRUSION DETECTION

(71) Applicant: STMicroelectronics S.r.l., Agrate Brianza (IT)

(72) Inventors: Guido Marco Bertoni, Carnate (IT); Fabio Tota, Pavia (IT)

(73) Assignee: STMicroelectronics S.r.l, Agrate Brianza (IT)

( * ) Notice: Subject to any disclaimer, the term of this patent is extended or adjusted under 35 U.S.C. 154(b) by 28 days.

(21) Appl. No.: 13/840,666

(22) Filed: Mar. 15, 2013

(65) Prior Publication Data

US 2013/0249691 A1 Sep. 26, 2013

(30) Foreign Application Priority Data

Mar. 21, 2012 (IT) .............................. TO2012A0257

(51) Int. Cl.
*G08B 13/14* (2006.01)

(52) U.S. Cl.
USPC ...................... 340/568.1; 340/572.4; 340/541

(58) Field of Classification Search
USPC .............. 340/540, 541, 550, 522, 566, 568.1, 340/571, 572.1, 572.4, 686.1; 493/8, 464
See application file for complete search history.

(56) References Cited

U.S. PATENT DOCUMENTS

| | | | |
|---|---|---|---|
| 6,396,400 B1 | 5/2002 | Epstein, III et al. | |
| 7,061,390 B2 * | 6/2006 | Murata ...................... | 340/686.1 |
| 7,614,266 B2 * | 11/2009 | White et al. ...................... | 70/58 |
| 7,659,816 B2 * | 2/2010 | Wandel .......................... | 340/541 |
| 7,969,308 B2 * | 6/2011 | Cotton ........................ | 340/572.1 |
| 8,138,922 B2 * | 3/2012 | Lindsay et al. ............. | 340/572.3 |
| 8,339,263 B2 * | 12/2012 | Paananen et al. .......... | 340/572.1 |
| 2012/0050998 A1 | 3/2012 | Klum et al. | |

FOREIGN PATENT DOCUMENTS

| | | |
|---|---|---|
| EP | 2361003 | 8/2011 |
| GB | 2410144 | 7/2005 |

OTHER PUBLICATIONS

Search Report for Italian application No. TO20120257, Ministero dello Sviluppo Economico, The Hague, Jul. 25, 2012, 3 pages.

* cited by examiner

*Primary Examiner* — Van T. Trieu
(74) *Attorney, Agent, or Firm* — Seed IP Law Group PLLC

(57) ABSTRACT

An embodiment of an apparatus has a closed housing accommodating an element to be protected, and a pressure sensor coupled to a control unit configured to detect pressure variations within the housing upon opening the housing. The control unit is configured to activate countermeasures upon detecting opening of the housing. For example, the apparatus may be a set-top box, a cell phone, a television set, a printer ink cartridge of toner cartridge, or a meter, wherein the element to be protected is a semiconductor chip and relevant couplings, storing an enabling code or key.

30 Claims, 2 Drawing Sheets

APPARATUS HAVING A HOUSING, WITH INTRUSION DETECTION

PRIORITY CLAIM

The instant application claims priority to Italian Patent Application No. TO2012A000257, filed Mar. 21, 2012, which application is incorporated herein by reference in its entirety.

TECHNICAL FIELD

An embodiment relates to an apparatus having a housing, with intrusion detection. In the ensuing description, specific reference will be made to a set-top box, but an embodiment can also be applied to other devices and apparati having a closed, for example sealed, housing, the contents whereof are not accessible and cannot be tampered with by the possessor, or to devices and apparatus on rental at the user premises or in places accessible to the public, where the renter or the public is not authorized to open the housing or gain access to the contents. In particular, the apparatus may accommodate chips forming electronic devices, integrated circuits, and/or memories, such as, for example, a cell phone, a television set, a meter (for electricity, gas, water), or the like.

SUMMARY

As is known, a set-top box is a non-portable electronic television apparatus designed to add a number of television functions to television sets, displays, computers, or other electronic apparati so as to increase the functions thereof. In particular, set-top boxes allow viewing of satellite and encrypted television channels and/or the use of pay services through subscriptions and/or payment of rentals or specific charges. Therefore, they store codes or other information used for authorizing reception/decryption of the television channels and/or use of the services provided.

In general, an apparatus of the type considered above includes one or more boards carrying components and circuits integrated on chips, such as memories, sensors, controllers, and the like, bonded to the boards.

Communication between the components/chips may be sensitive, and the data exchanged via the interconnections and/or stored in the chips may contain confidential information, such as codes, keys, information on accesses and authorizations, and the like.

Due to their position/location (for example, at the subscriber's premises or in public premises) and to prevent fraudulent use of the protected apparati, i.e., copying codes and/or accessing to confidential data, the chips storing the codes or confidential data and their interconnections are protected.

In particular, these apparati are generally contained in closed boxes or cases, for example sealed ones, such that tampering therewith involves a forcing action, for example, using screwdrivers, blades, levers of various kind, drilling, etc. Intrusion-detection systems have thus been proposed that, where activated, may actuate countermeasures of different types, from generation and transmission of alarms, to interruption of the service, up to destruction of the confidential data.

Currently proposed intrusion-detection systems include structures, such as wires, metal cages, contact structures, arranged on the lid and on the body of the housing, so that tampering may cause separation of two metal, or in any case conductive, parts and/or interruption of an electric circuit.

It is often, however, easy to get around such a solution by forming holes or openings in the housing that enable access thereto without opening the lid.

Another proposed solution includes providing light sensors inside the housing, so that any fraudulent opening thereof, causing entry of light, can be optically detected.

Also this solution has not, however, proven sufficient, since one can circumvent this solution by operating in dark rooms or other environments where the lighting is low.

Therefore, an embodiment is an anti-intrusion system overcoming at least one of the drawbacks of the prior art.

BRIEF DESCRIPTION OF THE DRAWINGS

For a better understanding of the concepts disclosed herein, one or more embodiments thereof are now described, purely by way of non-limiting example, with reference to the attached drawings, wherein.

DETAILED DESCRIPTION

Figure 1:
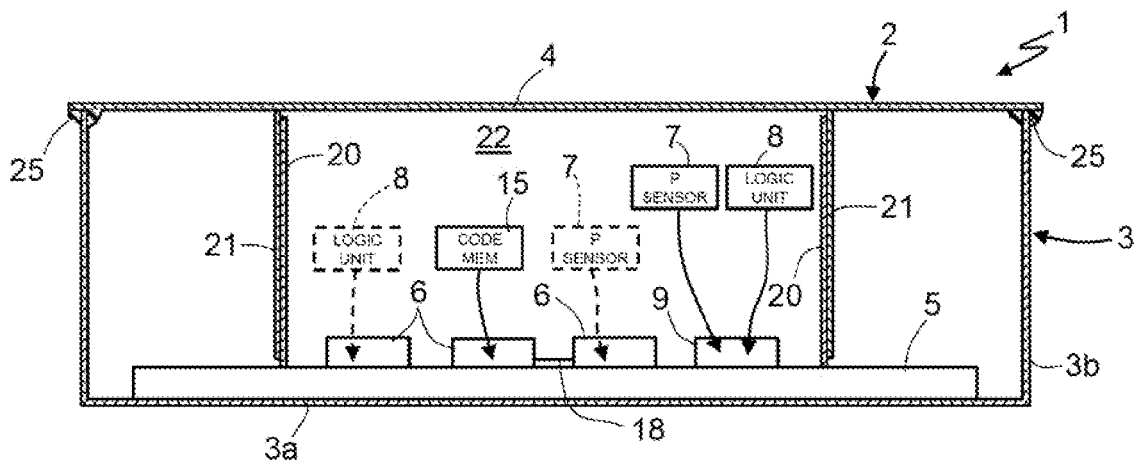
FIG. 1 is a cross-section through an embodiment of an apparatus.

FIG. 1 shows an apparatus 1, for example a set-top box to be used in conjunction with a television set for receiving premium television channels, satellite signals, and the like. The set-top box 1 includes a housing 2 formed by a box-shaped case 3 and a lid 4, sealed or fixed to the case 3 so as to prevent opening thereof by non-authorized third parties. For example, the lid 4 may be bonded to the case 3 using glue 25 or may have closing elements (not shown) co-operating with the case 3 and designed to prevent non-authorized opening of the lid 4. For example, the closing elements may include a physical lock with key, non-reversible mechanical-connection systems, such as crimping, welding, slotting, and the like.

The case 3, provided with a bottom wall (hereinafter "bottom") 3a and side walls 3b, carries a printed circuit board 5, of a known type, bonded to the bottom 3a. Device chips 6 are bonded to the printed circuit board 5 and are coupled to each other and to an interface (not shown) towards the outside through couplings and conductive paths (FIG. 1 schematically shows a conductive path 18 whereof) for supply and electrical coupling, for example, to the television set, the antenna, etc. The device chips 6 integrate electronic circuits, such as coding circuits, multiplexing circuits, conversion circuits, etc., and/or individual components, and at least one of them forms the element to be protected, possibly with conductive paths (not shown) that couple the device chip 6 to the other device chips 6 and/or to the outside.

Moreover the apparatus 1 has an intrusion-detection system, including a pressure sensor 7 and a control unit 8.

Figure 2:
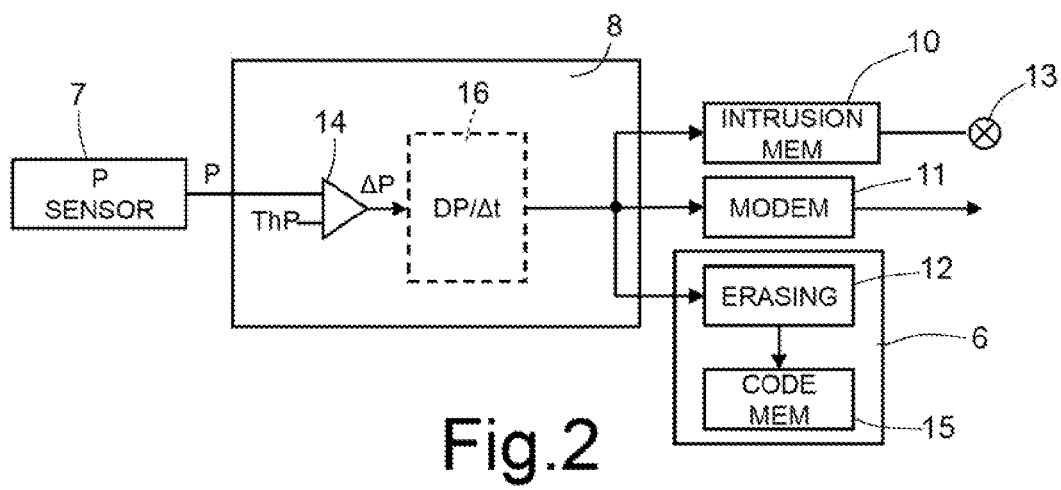
FIG. 2 shows a block diagram of a part of the apparatus of FIG. 1, according to an embodiment.

The pressure sensor 7 may be accommodated in a respective sensor chip 9, or, as shown with a dashed line, may be integrated in one of the device chips 6 integrating an electronic circuit formed in the set-top box. The pressure sensor 7 may be made in any way; for example, it may be a MEMS pressure sensor, having a pressure-sensitive semiconductor membrane coupled to processing electronics (not shown) so as to generate an electrical pressure signal P, as illustrated in the equivalent electrical circuit shown in FIG. 2.

In turn, the control unit 8 may be integrated in the chip 7 of the pressure sensor, in one of the device chips 6 integrating an electronic circuit formed in the set-top box, or in a specific device chip 6. In all cases, the control unit 8, for example a logic circuit, a CPU, or a controller, receives the pressure signal P, and, if it detects a sharp variation in pressure over a period of time, generates an alarm signal A.

In fact, opening the housing 2, for example, by opening the lid 4, may bring about a sudden variation (step variation) in pressure. This effect can be further enhanced if a pressure is maintained inside the housing 2 that is lower or higher than the external pressure, prior to gluing and sealing the lid 4, so as to have a pressure differential that goes to zero after opening.

According to an embodiment (see the diagram of FIG. 2), the control unit 8 includes a pressure-threshold detector 14, which compares the pressure P detected by the pressure sensor 7 with a threshold ThP, which is preset or determined on the basis of previous readings, and outputs a pressure-variation signal ΔP, which may be used for detecting any intrusion attempt. The pressure-variation signal ΔP may be directly stored in an intrusion memory 10, the contents of which may be then checked by a technician, and/or may be transmitted to an external center via a modem 11, frequently available in this type of apparatus, and/or may activate circuits 12 for resetting or erasing confidential information of the apparatus, such as codes, activation keys and the like, stored in a code memory 15, so as to prevent acquisition thereof by a non-authorized person. The intrusion memory 10 and/or the code memory 15 may be integrated in the sensor chip 7 or 9 or integrated in one of the device chips 6. The alarm state may also be signalled on the outside of the housing 2 by activating a warning light 13.

In an embodiment, the control unit 8 may include a differential circuit 16, coupled to the output of the pressure threshold detector 14 and calculating the pressure change rate n, in a known manner, to enable a more accurate evaluation and eliminate the risk of false alarms or even destruction of the code or key in the event of pressure drifts over time.

The apparatus 1 may have measures that enhance the effect of pressure variation inside the housing. In particular, in the example of FIG. 1, the printed circuit board 5 carries first inner walls 20 extending transversely to the bottom 3a of the case, towards the lid 4. In addition, the lid 4 has second inner walls 21, extending transversely to the lid 4, towards the board 5. The inner walls 20, 21, which define a compartment 22 within the housing 2, are in mutual contact or are very close so that opening of the lid 4, and, thus, moving away of the inner walls 20 and 21 causes, in the compartment 22, a suction effect of an amount such as to be easily detected by the control unit 8 and be readily distinguishable from non-tampering pressure variations, linked to environmental situations, displacement of the apparatus 1, or the like.

Figure 3:
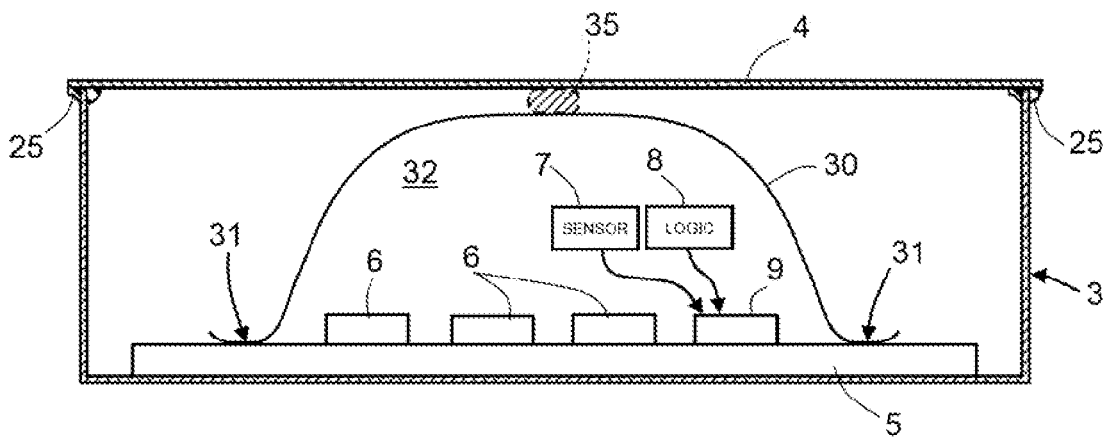
FIG. 3 shows a cross-section through a different embodiment of the apparatus.

In the embodiment of FIG. 3, a film 30 of plastic material covers and seals the area of the device chips 6 and 7, creating a sort of bubble.

In detail, the film 30, for example a polyethylene film, is sealed to the board 5 near the edges 31 of the film. For example, an air or a gas mixture is trapped in the space 32 delimited by the film 30 and by the board 5, at a higher pressure than ambient pressure. In this way, in the space 32, a sort of "bubble" is formed, similar to a bubble wrap. Access to the space 32 thus requires perforation of the film 30 and bursting of the "bubble", causing a sharp change in pressure, which may be detected by the pressure sensor 7 and the control unit 8, also here integrated in a separate sensor chip 9 or in one of the device chips 6.

It is, moreover, possible to couple part of the film 30 to the lid 4, for example via adhesive material 35, so that opening of the lid 4 automatically causes tearing of the film 30.

In a different embodiment, the film 30 may work as suction-pressure generator, similarly to the inner walls 20, 21. For example, if the film 30 is partially deformable and is bonded both to the board 5 and to the lid 4, as shown in FIG. 3, opening the lid 4 causes a stretching of the film, and thus a suction pressure within the space 32, which suction pressure may be detected by the pressure sensor 7.

Figure 4:
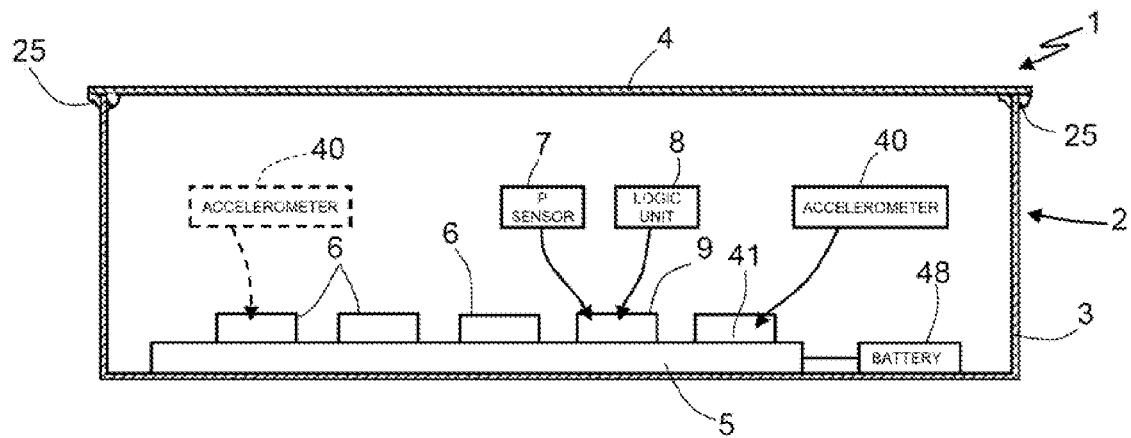
FIG. 4 shows a cross-section through another embodiment of the apparatus.

According to an embodiment shown in FIG. 4, the board 5 may include an accelerometer 40, integrated in a separate accelerometer chip 41. Alternatively, also the accelerometer 40 may be integrated in the sensor chip 9 or in one of the device chips 6 of the apparatus 1.

The embodiment of FIG. 4 enables data collected both by the pressure sensor 7 and by the accelerometer 40 to be processed so as to increase the reliability of the intrusion-attempt detecting system. In fact, in some applications, the apparatus 1 is mobile, and this could lead, in certain situations, to a variation of the pressure detected by the sensor 7, causing false alarms.

Figure 5:
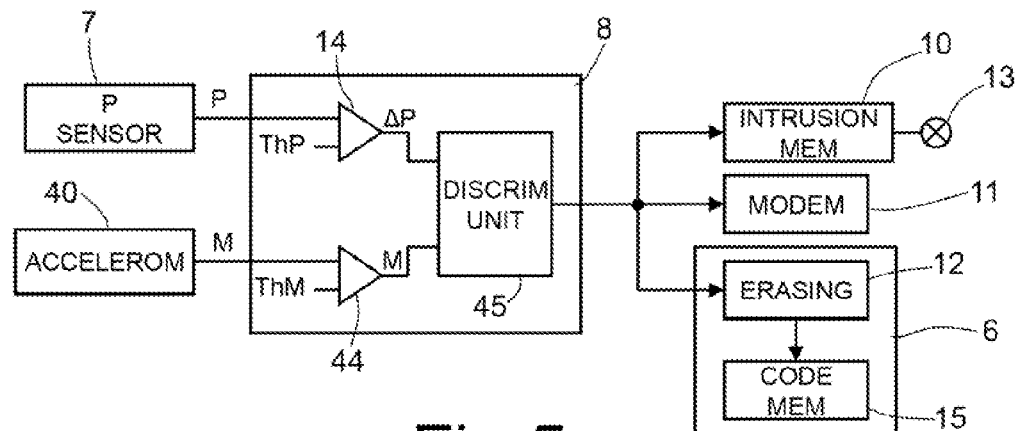
FIG. 5 shows a block diagram of a part of the apparatus of FIG. 4, according to an embodiment.

The further presence of the accelerometer 40 may overcome this problem. In fact, in the embodiment of FIG. 5, the control unit 8 includes, in addition to the pressure-threshold detector 14, a movement-threshold detector 44 coupled to the accelerometer 40 and generating a movement signal M when the signal generated by the accelerometer 44 exceeds a preset threshold.

A discrimination unit 45, receiving the signals ΔP and M, generates an alarm signal A only if the pressure-variation signal ΔP is generated in the absence of the movement signal M, i.e., if the pressure change is not associated with a movement. In this latter case, the system detects an intrusion attempt, and the signal A thus generated is supplied to the intrusion memory 10, and/or to the modem 11, and/or to the circuit 12 for resetting or erasing important information of the apparatus 1, similarly to what has been described above with reference to FIG. 2. Otherwise (i.e., in case of simultaneous presence of the pressure-variation signal ΔP and the movement signal M), the system recognizes the pressure change as being due to a legitimate movement of the apparatus 1 and does not intervene.

Figure 6:
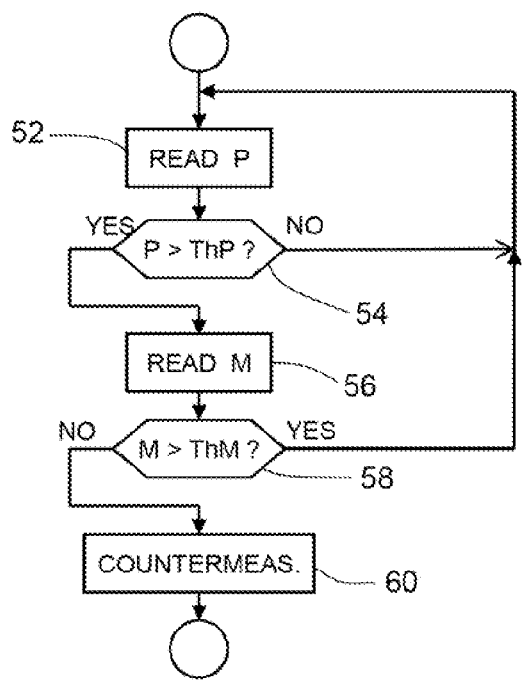
FIG. 6 is a flow chart of an intrusion-detection method that may be employed by the present apparatus, according to an embodiment.

An embodiment of the above-described tampering-detection method is represented in the flow chart of FIG. 6, wherein first (step 52) the control unit 8 reads the pressure value P. It then checks whether the latter exceeds a first threshold ThP (step 54). If so, it reads the movement signal M generated by the accelerometer 40 (step 56), and checks whether the movement signal M exceeds a second threshold ThM (step 58). If yes, (output YES from the step 58), then no countermeasures are activated. But if not (output NO from the step 58), then the countermeasures already described are activated (step 60).

In a variant of the method embodiment indicated above, after reading the pressure P (step 52) and after checking whether it has changed significantly, the control unit 8 may calculate the variation rate and activate the countermeasures or verify the movement condition of the apparatus 1 only if the pressure changing rate ΔP exceeds a given preset threshold.

A battery 48 (FIG. 4) may be provided inside the case 2, coupled at least to the chip 9 through the board 5, for powering the operation of the pressure sensor 7 also in the event of lack of energy from the outside, either upon random power-down or tampering.

An embodiment of the intrusion-detection system described above has numerous advantages.

First, it enables a reliable detection of any intrusion attempt with a technique that is not easy to circumvent. In addition, the system is simple and has a low cost so that it may be used also in low-cost apparatus and devices. The overall dimensions may be reduced to a minimum, in particular if the pressure sensor is provided as an MEMS sensor and is integrated, together with the control unit 8, in one of the device chips 6 already provided for operating the apparatus 1, enabling application thereof also in devices where the dimensions are critical (cell phones and similar hand-held devices).

Finally, it is clear that modifications and variations may be made to the apparatus and method embodiments described and illustrated herein, without thereby departing from the scope of the present disclosure.

For example, in FIG. 1, the first walls 20 may be bonded to the bottom 3*a* of the case 3, instead of to the board 5, and the overlapping between the first and second inner walls 20 and 21 may be only partial, but in any case so that, during the opening action of the lid 4, during the first part of the travel, the inner walls 20 and 21 overlap for a certain time period. Moreover, instead of using purposely provided walls 20 and 21 inside the housing 2, the suction effect may be obtained by using directly the side walls 3*b* of the case and pre-arranging separate counterwalls extending from the lid 4 and in direct contact with the side walls 3*b*.

The lid 4 may have a transparent window to enable visual inspection.

An embodiment may be applied also to devices/apparati of a different type, if it is desired to detect/prevent fraudulent access to an internal sensitive area and/or tampering with sensitive parts or confidential information. For example, the housing could be of a hermetic type, with sealed walls, without distinction between the case and its lid.

Furthermore, the control unit 8 may include a disabling system, to distinguish any fraudulent opening from authorized opening (for example, by a technician). In this case, using the modem 11, an authorized user could carry out an authentication procedure, for example, through a password or known authentication methods, allowing the alarm system to be disabled.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An apparatus, comprising:
    an item configured to be accessed;
    a first sensor configured to generate a first quantity that is related to a pressure within an enclosure that houses the item; and
    a controller configured to access the item and configured to generate, in response to the first quantity, a second quantity that is related to a breaching of the enclosure.
2. The apparatus of claim 1 wherein the first sensor is configured to be housed within the enclosure.
3. The apparatus of claim 1 wherein the first and second quantities respectively include first and second signals.
4. The apparatus of claim 1 wherein the second quantity includes an alarm.
5. The apparatus of claim 1 wherein the second quantity is configured to prevent an unauthorized entity from obtaining the item.
6. The apparatus of claim 1 wherein the second quantity is configured to disable the item.
7. The apparatus of claim 1 wherein the second quantity is configured to destroy the item.
8. The apparatus of claim 1 wherein the second quantity is related to an unauthorized breaching of the enclosure.
9. The apparatus of claim 1, further comprising a generator configured to cause a change in pressure within the enclosure in response to a breaching of the enclosure.
10. The apparatus of claim 1, further comprising:
    a second sensor configured to generate a third quantity that is related to a movement of the enclosure; and
    wherein the controller is configured to generate the second quantity in response to the third quantity.
11. A unit, comprising:
    an enclosure including an interior region having a pressure;
    an item configured to be accessed and disposed within the enclosure;
    a sensor configured to generate a first quantity that is related to the pressure; and
    a controller configured to access the item and configured to generate, in response to the first quantity, a second quantity that is related to an opening of the enclosure.
12. The unit of claim 11 wherein the item, sensor, and controller are disposed within the interior region of the enclosure.
13. The unit of claim 11 wherein the item includes an integrated circuit.
14. The unit of claim 11 wherein the item includes data.
15. The unit of claim 11 wherein the item includes a coupling.
16. The unit of claim 11 wherein the item includes a code.
17. The unit of claim 11 wherein the item includes a key.
18. The unit of claim 11 wherein the second quantity is related to an opening of the interior region of the enclosure.
19. A system, comprising:
    a first unit, including
    an enclosure including an interior region having a pressure,
    an item configured to be accessed and disposed within the enclosure,
    a sensor configured to generate a first quantity that is related to the pressure, and
    a controller configured to have access to the item and configured to generate, in response to the first quantity, a second quantity that is related to an opening of the enclosure.
20. The system of claim 19 wherein the first unit includes a set-top box.
21. The system of claim 19 wherein the first unit includes a smart phone.
22. The system of claim 19 wherein the first unit includes a printer ink or printer toner cartridge.
23. The system of claim 19 wherein the first unit includes a computing device.
24. The system of claim 19 wherein the first unit includes a meter.
25. The system of claim 19, further comprising a second unit coupled to the first unit.
26. The system of claim 25 wherein one of the first and second units includes a television set.
27. A method, comprising:
    determining a first quantity that is related to a pressure within an enclosure that houses an item that is accessible by a controller; and indicating a breach of the enclosure in response to the first quantity.

28. The method of claim 27 wherein:

the first quantity is related to a change in the pressure; and indicating a breach includes indicating a breach of the enclosure in response to the first quantity indicating that a change in the pressure exceeds a threshold.

29. The method of claim 27, further comprising:

determining a second quantity that is related to a position of the item; and wherein indicating a breach includes indicating a breach of the enclosure in response to the second quantity.

30. The method of claim 27, further comprising:

wherein the first quantity is related to a change in the pressure;

determining a second quantity that is related to a change in a position of the item; and wherein indicating a breach includes indicating a breach of the enclosure in response to the first quantity indicating that a change in the pressure exceeds a first threshold, and in response to the second quantity indicating that a change in the position of the item exceeds a second threshold.

\* \* \* \* \*